United States Patent [19]
McCaleb et al.

[11] Patent Number: 5,119,009
[45] Date of Patent: Jun. 2, 1992

[54] LITHIUM BATTERY DEACTIVATOR

[75] Inventors: Frank D. McCaleb, Loxahatchee; Basil Pagones, Fort Lauderdale, both of Fla.

[73] Assignee: Motorola, Inc., Schaumburg, Ill.

[21] Appl. No.: 340,636

[22] Filed: Apr. 20, 1989

[51] Int. Cl.⁵ .................. H02J 7/00; H01M 6/00; H01M 6/20
[52] U.S. Cl. .................................. 320/13; 429/7; 429/50; 429/105
[58] Field of Search ............... 429/7, 89, 105; 320/2, 320/13

[56] References Cited

U.S. PATENT DOCUMENTS

| | | | |
|---|---|---|---|
| 3,980,940 | 9/1976 | Mabuchi et al. | 320/13 X |
| 4,238,554 | 12/1980 | Barrella | 429/105 |
| 4,338,382 | 7/1982 | Fritts | 429/89 X |
| 4,407,909 | 10/1983 | Goebel | 429/7 X |
| 4,622,508 | 11/1986 | Matteau et al. | 320/13 |
| 4,648,015 | 3/1987 | Davis et al. | 363/15 |
| 4,734,635 | 3/1988 | Theobald | 320/13 |
| 4,871,956 | 10/1989 | Barrella | 320/13 |

*Primary Examiner*—R. J. Hickey
*Attorney, Agent, or Firm*—Juliana Agon; Thomas G. Berry

[57] ABSTRACT

A Lithium battery includes a switch to operatively activate the discharging circuit so that Lithium may be inactivated for safe disposal of the battery.

2 Claims, 1 Drawing Sheet

LITHIUM BATTERY DEACTIVATOR

TECHNICAL FIELD

This invention relates generally to battery discharging circuits, and more particularly to circuits for discharging a Lithium battery.

BACKGROUND ART

Using a battery to power a portable radio is known. However, a new problem has arisen with the advent of Lithium batteries. Since Lithium, will burn (and may explode) when exposed to water, a safe way to dispose of Lithium batteries is needed. Normally, when the Lithium battery is no longer able to power a device, some voltage potential remains in the Lithium. Therefore, a need exists for a way to fully dissipate all of the Lithium remaining in the battery before it is disposed.

SUMMARY OF THE INVENTION

Accordingly, it is an object of the present invention to provide for the dissipation of Lithium in a Lithium battery.

Briefly, according to the invention, a Lithium battery, includes a discharging circuit and a switch to operatively couple the discharging circuit to the battery so that Lithium may be dissipated for safe disposal of the battery.

DETAILED DESCRIPTION OF THE PREFERRED EMBODIMENT

Figure 1:
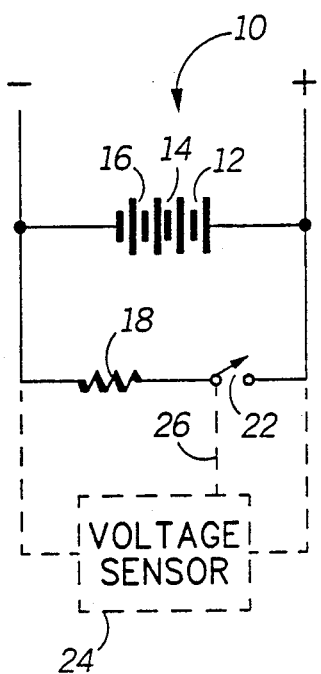
FIG. 1 is an electrical schematic diagram of a Lithium battery in accordance with the present invention.

Referring to FIG. 1, a Lithium battery 10 is shown to comprise a plurality of Lithium cells 12, 14, and 16 connected to a discharge means, which comprises a resistor 18, and a switch 22. When the switch 22 is closed, current form the Lithium battery 10 is discharged to ground via the resistor 18.

Depending on the value of the resistor 18, this discharge process may take several minutes or several hours. In any event, after substantially all of the voltage potential has been discharged from the battery, the Lithium will no longer react violently (burn or explode) when exposed to water. Therefore, the Lithium battery may be disposed without fear of a fire or explosion.

Optionally, a voltage sensor 24 may be connected in parallel with the Lithium battery 10. In this way, a control line 26 from the voltage sensor 24 automatically and electronically closes the switch 22 when a predetermined voltage level has been sensed. Once the switch 22 has been closed, it may be a further safety consideration to disable the switch 22 from opening again the ensure full discharge of the battery (i.e., a one-time switch).

Figure 2:
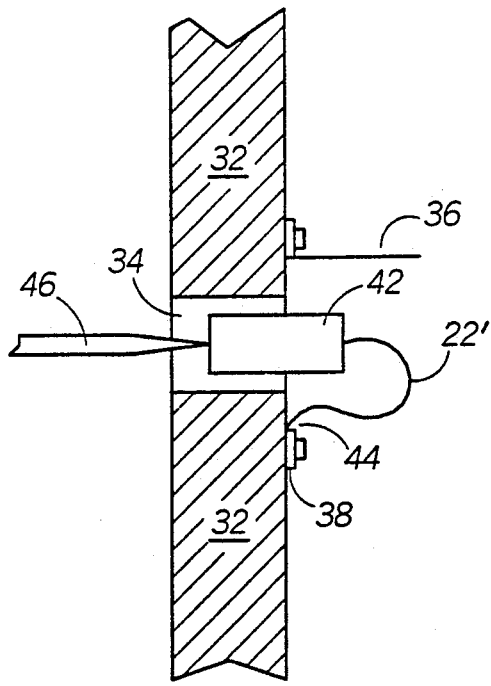
FIG. 2 is an elevational and side view of the mechanical switch of FIG. 1.

Referring to FIG. 2, a mechanical embodiment of the switch 22 of FIG. 1 is shown. A housing 32 for housing the battery 10 has an aperture 34 between a positive battery contact 35 and a negative battery contact 38. As is known, the resistor 18 may be placed before or after the switch 22 as long as the series combination of the resistor 18 and the switch 22 are in parallel with the battery 10. In the illustration of FIG. 2, the resistor 18 has been placed within the battery housing 32 at its negative contact 38. A mechanical switch 22' having a first end 44 connected to the negative battery contact 18 has its second end 42 floating within the aperture 34. The switch is manually closed by using any object (such as a pen, or a paper clip thin and long enough to protrude through the aperture 34) to push the second end of the switch 42 inwardly through the aperture 34. As a result, the spring tension at the first end 44 forces the second end 42 upward to make permanent contact (if desired) with the positive battery contact 36.

It will be appreciated that this mechanical switch embodiment is only one way of manually operating the switch of the present invention. Other variations are, of course, possible.

What is claimed is:

1. A safety mechanism for use in rendering a Lithium power source safe for disposal after use, comprising:
    a battery having at least one Lithium cell;
    discharge means for discharging said at least one Lithium cell;
    a manually operated switch means for selectively coupling said discharge means to said at least one Lithium cell to substantially complete discharging of said at least one cell; and
    a battery housing for housing said battery, said discharge means, and said manually operated switch means.

2. The safety mechanism of claim 1 wherein said means for selectively coupling comprises a one-time-operable switch for activating said discharge means.

* * * * *